United States Patent [19]

Chmura et al.

[11] 4,059,879
[45] Nov. 29, 1977

[54] METHOD FOR THE CONTROLLED MECHANICAL WORKING OF SINTERED POROUS POWDER METAL SHAPES TO EFFECT SURFACE AND SUBSURFACE DENSIFICATION

[75] Inventors: William J. Chmura, Southington; Ronald S. Slusarski, Berlin; Charles B. Burk, Collinsville, all of Conn.

[73] Assignee: Textron Inc., Providence, R.I.

[21] Appl. No.: 632,709

[22] Filed: Nov. 17, 1975

[51] Int. Cl.$^2$ ................ B21K 1/04; B21H 1/12
[52] U.S. Cl. ............... 29/148.4 R; 29/263; 29/283; 29/420.5
[58] Field of Search ........... 29/148.4 C, 149.5 PM, 29/148.4 R; 308/190 US, 193 US

[56] References Cited

U.S. PATENT DOCUMENTS

| 1,648,721 | 11/1927 | Claus | 29/149.5 PM |
| 2,225,269 | 12/1940 | Hildabolt | 29/149.5 PM |
| 2,360,528 | 10/1944 | Talmage | 29/149.5 PM |
| 3,230,606 | 6/1965 | Saito et al. | 29/148.4 R |
| 3,365,253 | 1/1968 | Haller | 308/190 |
| 3,382,693 | 5/1968 | Rozhdestvensky et al. | 29/148.4 R |
| 3,492,120 | 1/1970 | Haller | 29/149.5 PM |
| 3,626,564 | 12/1971 | Daniel | 29/148.4 R |
| 3,782,794 | 1/1974 | Chmura et al. | 308/193 |
| 3,803,890 | 4/1974 | Connell | 29/148.4 R |
| 3,831,241 | 8/1974 | Elmore et al. | 29/148.4 R |

FOREIGN PATENT DOCUMENTS

| 255,922 | 11/1927 | Italy | 29/149.5 PM |

*Primary Examiner*—C.W. Lanham
*Assistant Examiner*—V. Rising
*Attorney, Agent, or Firm*—Hopgood, Calimafde, Kalil, Blaustein and Lieberman

[57] ABSTRACT

A method is provided for partially densifying a selected surface portion of a sintered porous powder metal element while applying restraining pressure to other selected portions of said element in order to inhibit growth and cracking of said element during the partial cold deformation thereof. The method is particularly applicable to the production of annular bearing rings.

21 Claims, 19 Drawing Figures

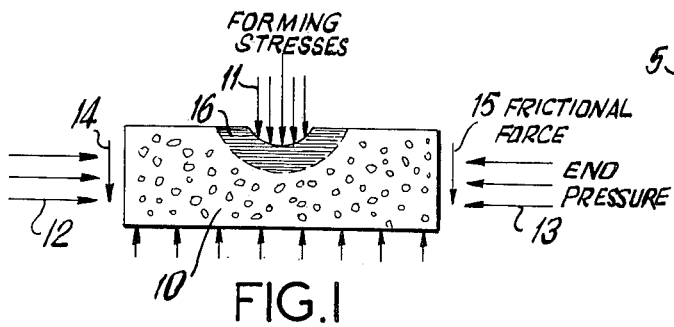
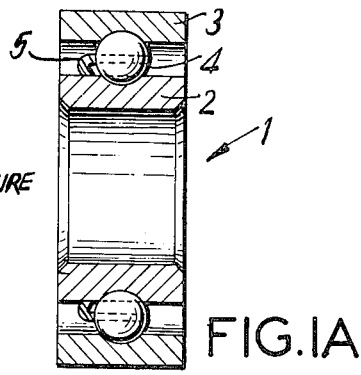
FIG.1  FIG.1A
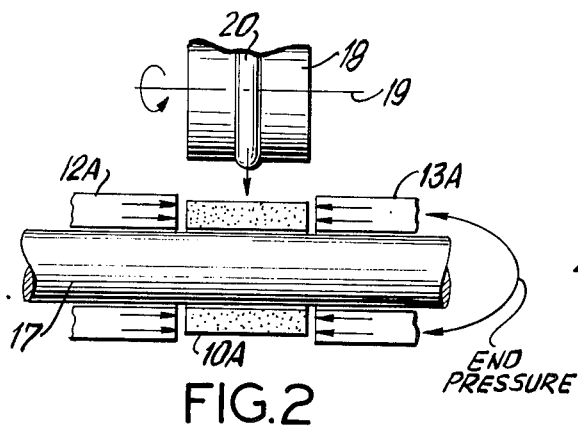
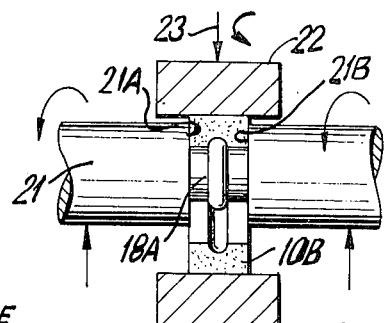
FIG.2  FIG.3
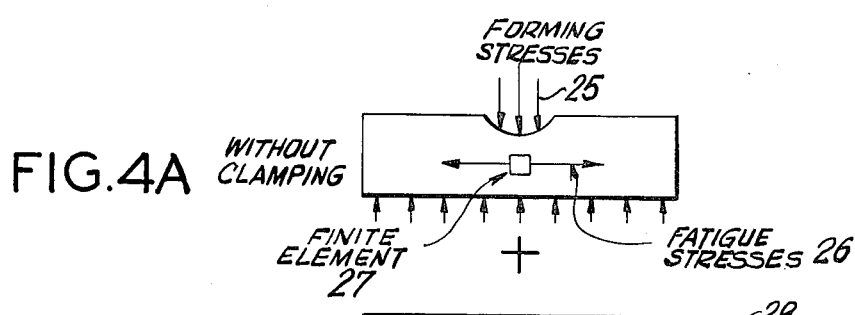
FIG.4A
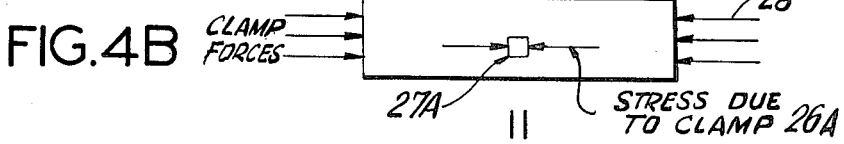
FIG.4B
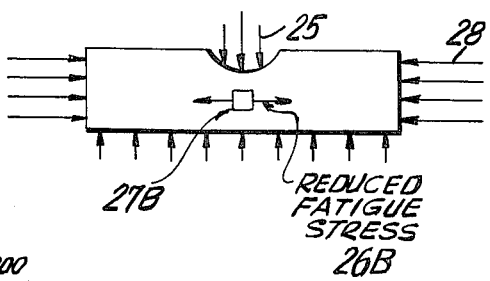
FIG.4C
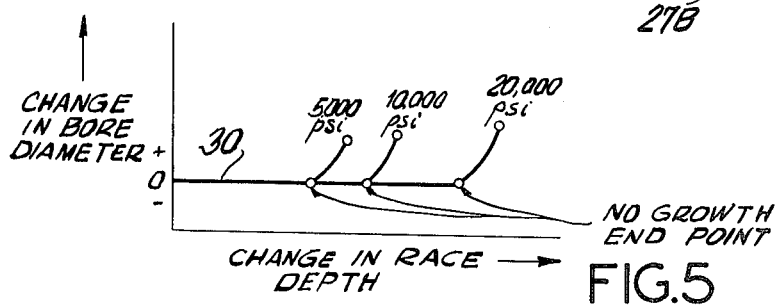
FIG.5

METHOD FOR THE CONTROLLED MECHANICAL WORKING OF SINTERED POROUS POWDER METAL SHAPES TO EFFECT SURFACE AND SUBSURFACE DENSIFICATION

This invention relates to a method for partially mechanically working or deforming a selected portion of a sintered porous powder metal element to effect surface and subsurface densification thereof while inhibiting the growth and cracking of said element during the partial deformation thereof. The invention is particularly directed to the powder metallurgy production of bearing rings, and the like.

STATE OF THE ART

It is known to produce annular bearing races from wrought metal blanks by mechanically rolling the raceway groove therein with a circular grooving die. One method is disclosed in U.S. Pat. No. 3,626,564 (dated Dec. 14, 1971) in which an internal bearing race is produced from an annular blank or body which is initially undersized. The annular blank is rolled within a sizing ring by employing a small internal rolling die provided with an external rib shaped to produce the raceway groove at the inner surface of the annular blank. As the raceway groove is being rolled, the diameter of the annular blank increases in size until the resulting annular bearing ring fills completely the sizing ring.

The amount of growth in the ring is dependent upon the amount of metal displaced by cold deformation, particular care being taken to avoid cracking during cold deformation due to work hardening. Because of the amount of growth which occurs in selectively working solid wrought metal rings, the annular blank is necessarily produced undersize, the amount of undersize depending upon the cold working characteristics of the particular metal composition. For example, ferritic stainless steel has a higher rate of work hardening than austenitic stainless.

A disadvantage of the foregoing method is that wrought metal steel ring blanks are produced by machining which results in considerable waste of material which adds to the cost of the product. Moreover, the method employed is time-consuming from the viewpoint of production rate.

Another method which has been proposed for producing bearing rings involves the use of powder metallurgy, also referred to as P/M. The advantage of the P/M method is the high production rates and efficiencies inherent in the method. A P/M method is disclosed in U.S. Pat. No. 3,782,794 (dated Jan. 1, 1974) for producing antifriction bearing rings, the method comprising forming a sintered porous powder metal annular blank, and then forming a bearing raceway on a circumferential bearing face of the annular blank by mechanically cold working a selected area of the face to a suitable depth to support rolling elements therein and thereby produce a highly dense zone adjacent the bottom of the raceway of average density of at least about 95% of theoretical density of the metal, the remaining portion of the sintered metal outside the dense zone being substantially porous and having an average density of about 80% to 92% of the theoretical density of the metal.

An advantage of the foregoing method is that the provision of a dense zone at and adjacent the raceway confers improved fatigue life to the bearing ring, the fatigue life being further increased by allowing for the presence of a porous region below the dense zone which makes the bearing ring more compliant to applied load.

The method described in the aforementioned patent was a marked step foward in the use of P/M techniques in the production of bearing rings. By utilizing a porous structure, local densification results in a race of high density at and near the surface thereof by closing up the pores. The closure of the pores at the start of deformation reduces macro-growth of the ring. However, when deeper races were desired, the reduced porous structure tended to cause the ring to grow beyong its original dimensions, and, the low ductility inherent in the porous structure tended to cause the ring to fracture.

Tests indicated that, with P/M materials cyclically formed, there was also a tendency towards fatigue form of failure, and that it was necessary to inhibit such fatigue failures if deep races were to be produced. Also, even though the selected area was substantially densified to the optimum density, a few individual large pores tended to remain at or near the surface of the raceway which served as a weak link in the very specific ball bearing Hertzian stress situation and which would precipitate premature bearing failure.

OBJECTS OF THE INVENTION

It is an object of the invention to provide an improved P/M method for partially and selectively cold deforming a surface portion of a sintered porous powder metal element while inhibiting the growth and cracking of said element.

Another object of the present invention is to provide a P/M method for producing close tolerance bearing rings from sintered porous powder metal ring blanks wherein the races thereof are produced by cold deformation while greatly inhibiting the growth and cracking of said rings.

These and other objects will more clearly appear when taken in conjunction with the following disclosure and the accompanying drawings, wherein:

FIG. 1 illustrates schematically the use of the invention in producing a raceway in the outer surface of a sintered powder metal bearing ring element while inhibiting growth of said element during the formation of said raceway;

FIG. 1A shows a typical bearing comprising inner and outer bearing rings with bearing balls disposed therebetween;

FIGS. 2 and 3 depict two methods for mechanically forming a raceway in a bearing ring while inhibiting by applied pressure the growth of said ring;

Figure 6:
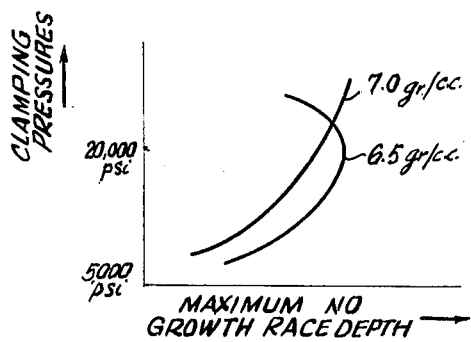
Figure 7:
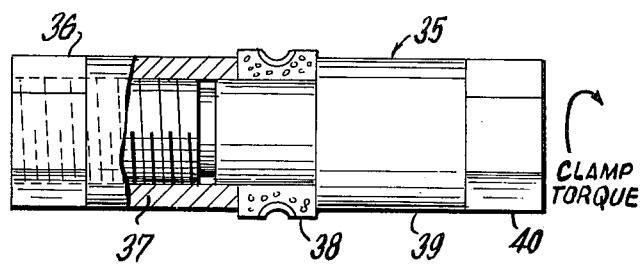
Figure 8A:
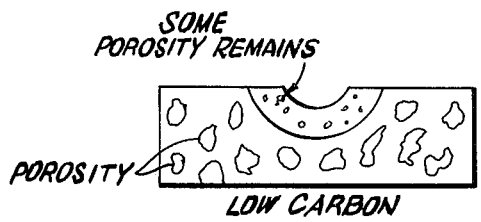
Figure 9A:
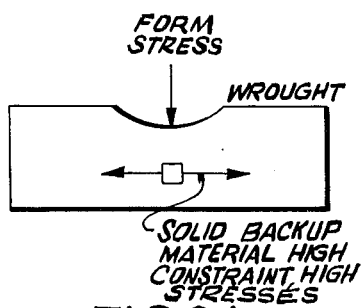
Figure 9B:
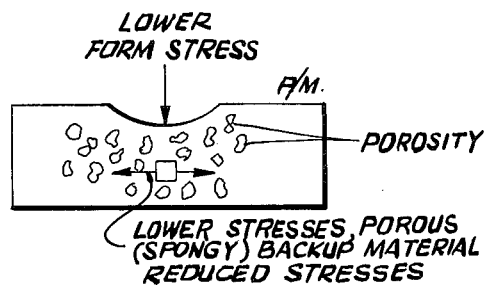
Figures 10, 11:
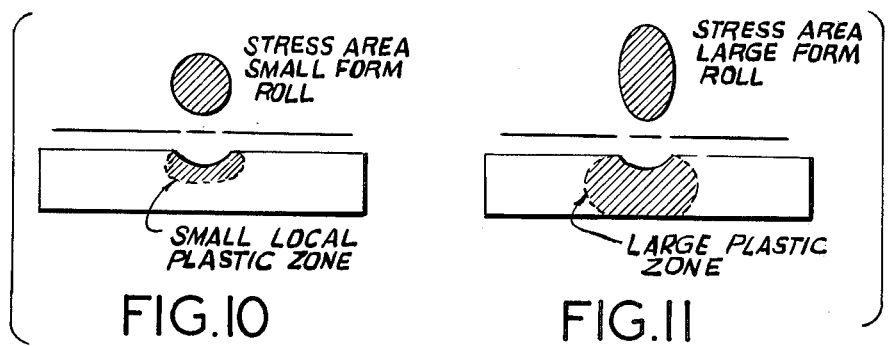
Figures 12, 13:
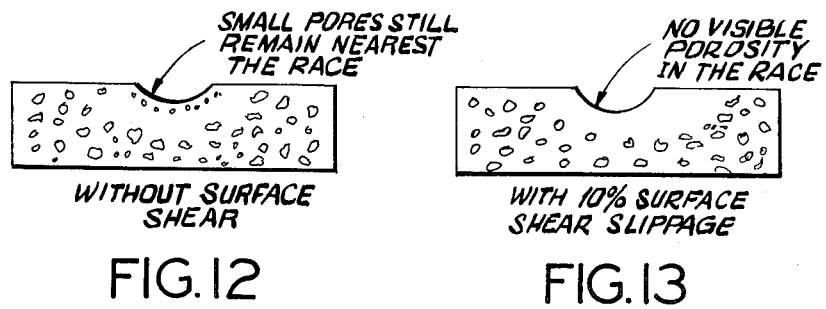
Figure 14:
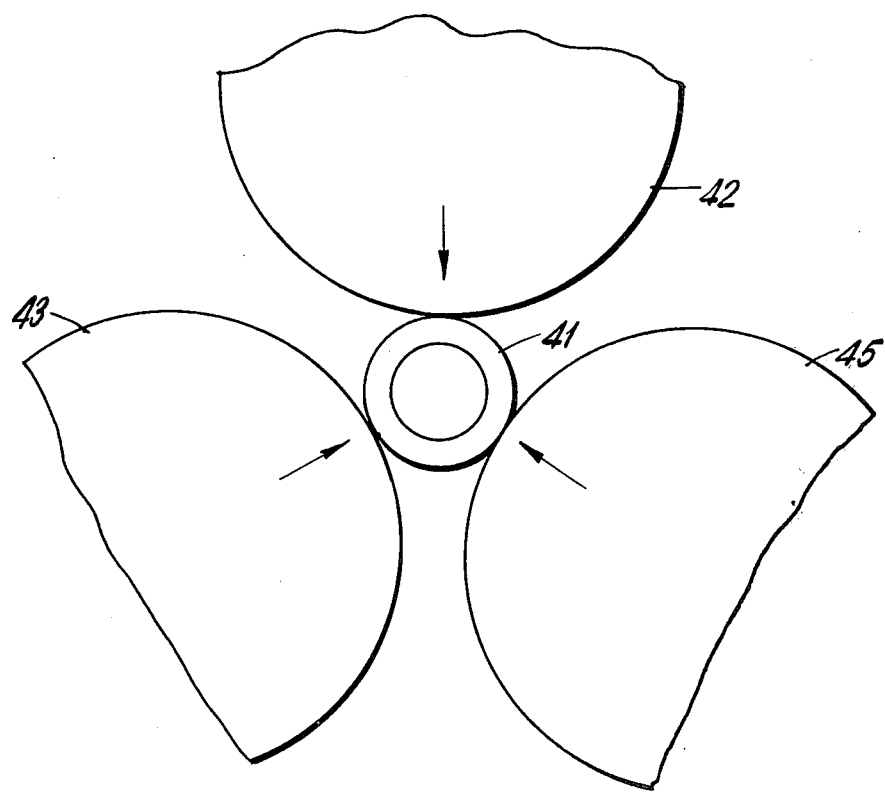

FIGS. 4A, B and C is a stress analysis illustrating the effect of restraining pressure on the reduction of fatigue stresses during the formation of a raceway in a bearing ring element;

FIG. 5 depicts a group of curves illustrating in a general way the influence of race penetration on growth of the bore diameter of a bearing ring for various values of applied restraining or clamping pressure;

FIG. 6 depicts curves showing the effect of clamping pressure applied to a bearing ring on the production of maximum no-growth race depth;

FIG. 7 depicts a mechanical assembly for applying clamping pressure to a P/M bearing ring element;

FIGS. 8A and B illustrates the differences in subsurface porosity when a low or high strength P/M blank is used respectively;

FIGS. 9A and B depicts the differences in forming stresses found when either a low density material (FIG. 9B) and a wrought material (FIG. 9A) were used;

FIGS. 10 and 11 illustrate schematically the effect of a small and a large form roll, respectively, in the production of a highly densified zone in the raceway of a bearing ring;

FIGS. 12 and 13 show, respectively, the effect of applying no shear and of applying shear during formation of the raceway in the production of raceways with and without porosity; and FIG. 14 is a schematic showing the use of three rolling dies in the production of races on the outer surface of a P/M bearing ring element.

STATEMENT OF THE INVENTION

Generally stated, the invention is directed to a method for partially cold deforming and densifying a first selected surface portion of a sintered porous powder metal element having a finite thickness while inhibiting growth and cracking of the element during said cold deformation, the method comprising, providing said sintered powder metal element having a porosity corresponding to a density of about 70% to 90% of true density; applying restraining pressure to other selected portions of said element which have a tendency to grow when said first selected portion is subjected to cold deformation by mechanical working; and maintaining said applied restraining pressure while partially cold deforming the surface of said first selected portion of said element to densify said surface by application of deforming stresses such that the subsurface is markedly densified while the remaining thickness of said element is maintained substantially porous; the amount of restraining pressure being at least sufficient to inhibit growth of said porous element during said cold deformation, said restraining pressure being such as not to exceed the yield point of said element to inhibit the cracking thereof during said partial cold deformation. The invention is applicable, for example, to the partial deformation of elements whose final size is within ± 1.5% of the initial size.

A unique characteristic of the foregoing method is that improvements in tolerance can be obtained as compared with known phenomena in the forming of solid wrought material in which case more open tolerances are realized on the formed part than in the initial blank. This unique characteristic is obtained when maximum advantage is taken of the inherent compressibility factor of P/M material together with other parameters.

With regard to P/M bearing ring elements, the blank need not be completely densified but only that portion which supports the rolling elements. Thus, ring growth can be greatly inhibited, if not completely avoided, due to the compressibility of the porous blank and by utilizing restraining pressure to prevent mass movement of metal during cold deformation.

As an improvement over U.S. Pat. No. 3,782,794, the invention enables the production of greater race penetration which provides bearings having increased bearing thrust capacity and endurance life. The invention permits greater use of the method over a broader range of bearing designs.

Generally speaking, in the cold deforming of metal, the inherent ductility of the metal part being deformed limits the amount of deformation. Where the part is a sintered porous metal blank, the amount of deformation is limited due to the tendency of the blank to crack in forming deeper races. Obtaining deeper races without fracture of the ring was a perplexing problem until considerable test work brought to light an intermediate form of failure due mainly to fatique which occurred during cyclical forming of the raceway. When this phenomenon was understood, techniques were adopted which reduced the fatique stresses within the material as well as the number of fatique cycles during the deformation process. These refinements can be summarized as follows:

1. using an optimum penetration rate of dies into the P/M part to be formed;
2. using restraint on the P/M element during forming which caused a reduction in damaging fatique stresses and prevented ring growth; and
3. using a material selected to be more fatique resistant (higher carbon contents) and one which requires less force to form as well as having a reduced tendency to grow (lower densities).

The refinements coincidentally enabled greater densification under the race due to larger amounts of deformation. Additional techniques were also employed to decrease porosity on and under the race. These are:

4. the use of small die diameters relative to the part size which localized deformation;
5. the use of different diameters of multiple dies rotating at the same speed eliminated the few remaining pores found to exist nearest the surface.

DETAILS OF THE INVENTION

Powder Metal Compaction

The sintered porous metal ring element is produced similarly as in U.S. Pat. No. 3,782,794. A steel powder composition is cold pressed in an annular die dimensioned to produce the desired size. The composition is compacted at a pressure of about 30 to 45 tons per square inch and the resulting blank then sintered under substantially non-carburizing conditions in an atmosphere of cracked ammonia for about 20 minutes at a temperature of about 2050° F. The sintered blank has a density of about 80 to 92 percent of the actual steel density and generally from about 95 to 92 percent of the actual density.

Powder Type and Alloy

The types of steel powder used are preferably selected according to those which are economically attractive as well as those which are the most practical. The powder composition may comprise a mixture of elemental powders. Generally, such mixtures tend to result in composition heterogeniety. However, this may be beneficial since such compositions tend to be incompletely alloyed during sintering and thereby provide ductile areas which inhibit brittle fractures from forming in the porous regions of the bearing ring.

Pre-alloyed powders, however, are preferred such as those produced by atomization from a liquid melt. To assure that such powders are compactable, the carbon is omitted from the composition, the carbon being subsequently blended to the atomized powder prior to compaction. Alternatively, the carbon can be added after the blank has been sintered by carburizing the sintered blank to the desired carbon level.

The invention is applicable to a wide variety of bearing steels, such as 52100-type steels, low nickelmolybdenum steels, molybdenum-manganese steels, and the like. Thus, for the purpose of this invention, a steel is defined as a composition containing by weight at least about 65% iron, about 0.3 to 1.5% carbon and the balance steel alloying ingredients.

Examples of bearing steels which may be employed in the invention include 4% Ni, 2% Cu, 0.6% C and the balance iron; 1.5% Mo, 1% C and the balance iron; 0.5% Mo, 0.5% Mn, 1% C and the balance iron; and the bearing steel designated as 52100 comprising 1.5% Cr, 0.5% Mo, 1% C and the balance iron. Atomized powders are preferred.

ILLUSTRATIVE TYPICAL BEARING

As depicted in FIG. 1, a typical bearing 1 is shown comprising inner and outer rings 2 and 3, respectively, with balls 4 confined therebetween and held in the raceways by cage 5.

Penetration Rate

In form rolling P/M races according to the practice of U.S. Pat. No. 3,782,794, the rate of race penetration employed was about 0.0002 inch per revolution of the part, e.g. the ring. Thus, the formation of a recess of about 0.025 inch depth and greater would have required a total number of part revolutions of over 100 and up to 200 or higher. We have since found that such cyclical forming of the races, depending upon the P/M material being formed, may cause premature failure due to fatigue. However, as stated hereinbefore, such failure for relatively large race depths can be minimized by placing the P/M ring element under constraint, e.g. clamping pressure. We have further found that premature fatique failure during race forming can be further prevented by forming the race by using greater die feed rates so that less than 10 revolutions of the part are required to produce a finished raceway. Thus, we prefer to complete the formation of the race in less than 10 revolutions of the part or ring and preferably not exceeding 5 or 6 revolutions.

In one test program, a race depth of about 0.04 inch was formed in a one inch O.D. bearing ring element having a width of 7/16 inch by feeding the die roll into the surface of the ring at a rate of 0.0084 inch per part revolution, the complete race being formed in 4¾ die revolutions. The resulting bearing ring had good properties, the overall average density of the ring being about 6.8 grams/cc (86.5% of true density), the density at the race portion being about 7.8 grams/cc (over 99% of true density). In this case, the initial ring density was 6.34 grams/cc (about 80% of true density).

The Use of Constraint in Forming Deeper Races

The schematic shown in FIG. 1 illustrates the use of applied end pressure in producing deeper races while inhibiting growth and cracking in the production of inner bearing rings from P/M blanks. A section 10 of a sintered P/M bearing ring element is shown having a predetermined porosity. Forming stresses 11 are applied centrally to the outer surface of the element by means of a rolling die (note FIG. 2) while end pressures (e.g. clamping pressure) 12, 13 are applied substantially perpendicular to forming stresses 11. The amount of end pressure selected should be such as not to exceed the yield point of the porous element and at least sufficient to provide enough friction 14, 15 at the opposite ends of the bearing element to assure the desired constraint and to inhibit increases in the circumference of the bearing ring as the race is being formed. In this manner, a highly densified zone 16 is formed, the remaining part of the bearing ring being porous as shown.

Two mechanical models are shown (FIGS. 2 and 3, respectively) for applying constraint to the bearing ring during formation of the race. In FIG. 2, a sintered P/M ring 10A is shown mounted on shaft 17 with end pressure means 12A, 13A also mounted on said shaft to apply clamping pressure against the opposite ends of the bearing ring. For example, means 13A may be a threaded nut mounted on threads of shaft 17, the nut being tightened to apply force against the end of the bearing and in turn against pressure-reacting back-up means 12A fixed or anchored to the shaft. A raceforming die roll 18 is spaced from the ring and mounted for rotation on an axis 19 parallel to the axis of shaft 17. The die has a circular rib 20, the curvature of which is the male counterpart of the race recess to be formed in the surface of the inner bearing ring. The rate of feed of form roll 18 is such as to form a complete race within one or two revolutions of the P/M ring while inhibiting growth and cracking of the ring.

FIG. 3 illustrates another embodiment for applying constraint where the race is formed on the inner surface of an outer bearing ring element. In this instance, the form roll or die 18A is located in the center of the shaft or mandrel 21 and has a smaller diameter relative to the diameter of the shaft which provides annular shoulders 21A, 21B between which bearing ring element 10B is supported, a constraining ring 22 of larger diameter being provided surrounding the outer periphery of the bearing element. Pressure 23 is applied against constraining ring 22 in opposition to the application of forming stresses by forming die 18A.

The two mechanical models thus illustrate the concept of applying restraining pressure to selected portions of the bearing ring element which have a tendency to grow while another selected portion is subjected to cold deformation by mechanical working (raceway formation), the restraining pressure being within the elastic limit of the material to inhibit the cracking of the ring as the raceway is being formed.

The importance of employing constraint in achieving the results of the invention is shown schematically in FIG. 4 comprising bearing elements (A), (B), and (C). Element (A) shows stress distribution during race formation without the use of constraint. Thus, as forming stresses 25 are applied to (A), fatigue stress 26 is set up (tension) on finite element or increment 27 within the element as shown, the magnitude of which increases with the formation of deep races and, with it, the tendency for fatigue cracking during cyclical formation of the race.

Element (B) of FIG. 4 illustrates the stress distribution which results when the element is put under constraint by clamping pressure 28 before the race is formed. As will be noted, finite element increment 27A is placed under compression via stresses 26A.

By combining or adding the stress effects of (A) and (B) in the production of the race by die rolling in (C), it will be noted that the resultant fatigue stress in tension is greatly reduced and with it the tendency for cracking so long as the restraining pressure does not exceed the elastic limit of the material.

Beneficial effects are achieved by clamping the inner ring during the race-rolling operation as shown in FIGS. 1, 2 and 4 with stresses approaching the yield strength of the material being rolled. This technique allows for increased depth of penetration before fatigue fracture develops and also inhibits ring growth.

The importance of clamping pressure in forming a deep race will be apparent by referring to FIG. 5 which relates bore growth of the ring to change in race depth when the depth of the race at a particular clamping pressure exceeds that value which leads to ring growth. In FIG. 5, reference line 30 represents zero bore growth of the ring. Referring to this reference line, it will be noted that, as the clamping pressure increased from 5000 psi to 10,000 psi and then to 20,000 psi, the no-growth depth of the race likewise increases. However, when the depth exceeds the no-growth depth, it will be noted that the ring circumference increases. As the circumference gets larger, then cracking is likely to occur.

No-growth race depth is defined as that race depth achieved by cold rolling at which ring growth is substantially inhibited if not prevented.

Referring now to FIG. 6, curves are shown relating clamping pressure to maximum no-growth race depth for two P/M ring elements made of steel powder, one having a density of about 7 grams/cm$^3$ (about 90% of true density) and the other a density of 6.5 grams/cm$^3$ (about 83% of true density). It will be noted that, with the more porous material, the race depth reaches a maximum with increase in clamping pressure and then decreases when the clamping pressure increases beyond 20,000 psi; whereas, the race depth of the more dense element is expected to decrease at even higher clamping pressures. The decrease in no-growth depth for the less dense material is believed due to an extrusion effect caused by high clamping pressures.

A clamping mechanism which has been found very useful in controllably applying constraint to the bearing ring during experimental work is illustrated in FIG. 7, the mechanism comprising a bolt 35 on the partially threaded shaft of which is threaded a back-up clamp nut 36 against which a supporting sleeve 37 is mounted, the P/M ring 38 being coaxially supported against said sleeve, another sleeve 39 being coaxially mounted against the side of the bearing. A hex nut 40 is threaded to the end of the bolt, by means of which a measured amount of torque is applied corresponding to the desired restraining pressures. The clamping mechanism is designed to be mounted in a die rolling machine having at least two die rolls, for example, preferably three (note FIG. 13), which are fed perpendicular to the axis of the bearing ring to mechanically work the race therein to the desired depth.

Material Selection

The recognition that fatigue is the primary failure mode in the forming of powder metal rings permits a more careful evaluation of the preform material specifications. Whereas those skilled in the art will recognize that ductility will limit the amount of deformation, we have found it more desirable, in order to get deeper and more dense races, to use materials which are both of higher strength and more porous - both less ductile than other alternatives. The successful use of materials such as these is possible due to the application of the techniques of high penetration rates and the constraint as discussed previously.

The use of high strength (obtained most easily by increasing carbon content) porous material is normally undesirable for forming because of its brittleness. However, we have found it to be desirable in the forming of bearing races when taken in conjunction with the process modifications noted above because:

1. The use of higher strength to be desirable in the forming of bearing races when taken in conjunction with the process modifications noted above because of the increased fatigue strength of the blank. The resistance to failure (as described in FIG. 4) during forming deeper races is increased.

Figure 8B:
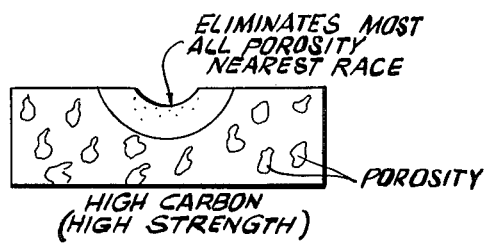

2. It results in superior subsurface structure because it more completely eliminates porosity which is so very detrimental to bearing life. See FIG. 8 (A and B). Experiments have borne this out.

Higher strength materials can be most easily obtained by increasing the carbon content of the blank. We have found that carbon contents of up to about 0.8% work well, such as about 0.3% to 0.8%.

Since lower density preforms are much more brittle than higher density ones, it would be assumed that they would deform less. However, we find the use of lower density preforms more desirable for two main reasons:

1. The porous nature of the material reduces the magnitude of stress constraint due to the ring material itself. By example of having the same forming stress on materials which in one case is wrought and in another is porous, we can see that the more porous a material, the less the magnitude of fatigue stresses. See FIG. 9 (A and B).

2. The more porous a material, the deeper a race can be formed because there is more room (pores) to put the race displaced material. This has advantages in the design of bearings for thrust loading.

The Use of Small Forming Dies

As stated hereinbefore, clamping inhibits fatigue because of the residual stresses set up within the bearing ring elements. An advantage of using clamping pressure is that small diameter form rolls can be used (higher specific stresses) which result in less ring growth and which enable high local densification which is very desirable.

In this connection, reference is made to FIGS. 10 and 11 which show the effect on local densification using a small form roll (FIG. 10) in which the densified zone is highly localized as opposed to a much larger zone (FIG. 11) obtained with a large die roll. The smaller sized roll localizes the densification, thus providing higher density adjacent the race itself.

This will be apparent from the following data obtained on a nominal ring size of 1 inch O.D., ⅝ inch bore and 7/16 inch wide. The P/M ring had a density of about 6.3 to 6.5 grams/cm$^3$ and was made from a prealloyed steel powder to which 0.8% by weight of graphite was added before the part was pressed and sintered. In one instance, the race was made using a forming die of 7.5 inches in diameter and in the other the forming die was 3 inches in diameter. Each ring was clamped using a force of 5000 lbs.

| Die Diameter | Max. Race Depth Before Fracture | Measured Density of Ring After Forming |
|---|---|---|
| 7.5 inches | 0.020 inch | 6.65 grs/c.c. |
| 3.0 inches | 0.036 inch | 6.74 grs/c.c. |

As will be noted, the reduction of the diameter of the die to almost half results in an increase in race depth of about 80% which is a marked increase considering that the starting material had an average density of about 81% of true density.

It is preferred that the ratio of the die roll diameter to the diameter of an outer bearing ring be as low as it is practical. For example, the diameter ratio of the die to the bearing element in the above example was about 3:1 for the deeper race and nearly 7.5:1 for the shallower race; preferred ratio being about 2:1 to about 4:1. Similarly, the die diameter of the forming mandrel to produce outer bearing rings (FIG. 3) should be as small as practical to the inner diameter of the ring.

The Use of Die Slippage

While the die rolls employed in forming the race generally have the same diameter and are rotated at the same speed, it is preferred when forming races in P/M elements to have one of the rolls slightly under-sized in order to provide some slippage during race deformation to set up shear forces along the surface of the race to insure substantially completed densification at the surface of the race.

It has been observed that, without surface shear stresses, there is a tendency for the rings to show retention of very fine pores at the surface of the high density race. This is illustrated in FIGS. 12 and 13 in which FIG. 12 shows some retention of very fine pores at the surface of the race when shear forces are not intentionally applied. However, when such surface shear forces are applied using 10% slippage during die rolling, the surface porosity is substantially avoided.

Only one die roll need be reduced in diameter for the foregoing purpose. Referring to FIG. 14, a bearing ring element 41 of about 1 inch O.D. and ⅝ inch I.D. is shown schematically at three points of contact with three die rolls 42, 43, and 45 of about 3 inches in diameter, one of the rolls, e.g. 42, being of slightly smaller diameter to provide circumferential slippage of about 10%. Thus, for a roll size of 3 inches in diameter, the circumference is about 9.4 inches. To provide 10% slippage, one of the rolls would have to have a circumference of about 8.1 inches or a diameter of about 2.56 inches.

The relative roll slippage may range from about 5% to 15% based on the difference in circumference of one die roll relative to the others.

SUMMARY

Generally speaking, the density of the subsurface of the element adjacent the deformed area is at least 95% of true density and usually at least 98%. The remaining portion of the element is substantially porous, the average density ranging from about 80% to 92% and generally 85% to 92% of true density.

A preferred method for producing an inner annular bearing ring having the foregoing characteristics resides in forming a sintered porous metal ring having a porosity corresponding to a density of about 70% to 90% of true density; using an alloy selected to have high fatigue resistance; coaxially supporting said ring on a rotatable mandrel including applying clamping pressure to opposite sides of said ring while supported on said mandrel; roll-forming a raceway onto the outer circumferential bearing surface of the inner ring by feeding radially towards said ring and perpendicular to the axis thereof three substantially equally radially spaced circular roll-forming dies, each having a continuous projecting rib in the form of a male counterpart of the raceway being formed while said mandrel is rotating; one of the roll-forming dies having a circumference of about 5% to 15% less than the circumference of the remaining dies such as to provide slippage during formation of the raceway; and continuing the formation of the raceway to a suitable depth to support rolling elements therein whereby shear forces are simultaneously applied during formation of the raceway to remove pores therefrom; the raceway depth being formed in less than 10 revolutions of said ring; whereby a highly densified subsurface is obtained adjacent said raceway of average density of at least about 95% or 98% of true density while the remaining portion of said ring is maintained substantially porous over the range of about 80% or 85% of true density; the amount of clamping pressure being at least sufficient to inhibit the growth of said ring during the formation of said raceway while substantially inhibiting the cracking of said ring during the roll-forming of said raceway.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for producing an annular metal bearing ring by powder metallurgy which comprises,
   forming a sintered porous metal ring having a porosity corresponding to a density of about 70% to 90% of true density, coaxially supporting said ring on a rotatable mandrel,
   applying restraining clamping pressure to opposite sides of said ring,
   and maintaining said clamping pressure while roll-forming a bearing raceway on a circumferential bearing face of said ring by mechanically cold rolling said raceway to a suitable depth to support rolling elements therein, such that the subsurface adjacent said raceway is markedly densified to at least 95% of true density while the remaining portion of said ring is maintained substantially porous over the range of about 80% to 92% of true density,
   the amount of clamping pressure being at least sufficient to inhibit growth of said ring during said working while substantially inhibiting cracking of said ring during cold rolling of said raceway.

2. The method of claim 1, wherein said sintered powder metallurgy ring is made of steel.

3. The method of claim 2, wherein said steel contains about 0.3% to 0.8% carbon.

4. The method of claim 2, wherein said subsurface adjacent the raceway is densified to at least 98% of true density.

5. A method for producing an annular bearing ring by powder metallurgy which comprises,
   forming a sintered porous metal ring having a porosity corresponding to a density of about 70% to 90% of true density,
   coaxially supporting said ring on a rotatable mandrel including applying clamping pressure to opposite sides of said ring while supported on said mandrel,
   roll-forming a raceway onto a circumferential bearing face of said ring using a circular die having a continuous projecting rib in the form of a male counterpart of the raceway being formed while said mandrel is rotating, and continuing the formation of said raceway to a suitable depth to support rolling elements therein, said raceway depth being formed in less than 10 revolutions of said ring, whereby a highly densified subsurface is obtained adjacent said raceway of average density of at least about 95% of true density while the remaining portion of said ring is maintained substantially porous over the range of about 80% to 92% of true density, the amount of clamping pressure being at least sufficient to inhibit the growth of said ring during the formation of said raceway while substantially inhibiting the cracking of said ring during the roll-forming of said raceway.

6. The method of claim 5, wherein said sintered powder metallurgy ring is made of steel.

7. The method of claim 6, wherein said steel contains about 0.3% to 0.8% carbon.

8. The method of claim 6, wherein said subsurface adjacent the raceway is densified to at least 98% of true density.

9. The method of claim 5, wherein said raceway depth is formed in not more than 6 revolutions of said ring.

10. A method for producing an inner annular bearing ring by powder metallurgy which comprises, forming a sintered porous metal ring having a porosity corresponding to a density of about 70% to 90% of true density, coaxially supporting said ring on a rotatable mandrel including applying clamping pressure to opposite sides of said ring while supported on said mandrel, roll-forming a raceway onto the outer circumferential bearing surface of said inner ring by feeding radially towards said ring and perpendicular to the axis thereof a plurality of radially spaced circular roll-forming dies each having a continuous projecting rib in the form of a male counterpart of the raceway being formed while said mandrel is rotating, and continuing the formation of said raceway to a suitable depth to support rolling elements therein, said raceway depth being formed in less than 10 revolutions of said ring, whereby a highly densified subsurface is obtained adjacent said raceway of average density of at least about 95% of true density while the remaining portion of said ring is maintained substantially porous over the range of about 80% to 92% of true density, the amount of clamping pressure being at least sufficient to inhibit the growth of said ring during the formation of said raceway while substantially inhibiting the cracking of said ring during the roll-forming of said raceway.

11. The method of claim 10, wherein said sintered powder metallurgy ring is made of steel.

12. The method of claim 11, wherein said steel contains about 0.3% to 0.8% carbon.

13. The method of claim 11, wherein said subsurface adjacent the raceway is densified to at least 98% of true density.

14. The method of claim 10, wherein said raceway depth is formed in not more than 6 revolutions of said ring.

15. The method of claim 10, wherein three radially spaced roll-forming dies are employed to produce the raceway and wherein one of said dies has a smaller circumference of about 5% to 15% less than the remaining dies, such as to provide die slippage during the formation of said raceway, whereby shear forces are simultaneously applied during the formation of said raceway to remove pores in the raceway.

16. The method of claim 10, wherein the ratio of the diameter of the dies to the diameter of the bearing ring ranges from about 2:1 to 4:1.

17. A method for producing an inner annular bearing ring by power metallurgy which comprises, forming a sintered porous steel metal ring having a porosity corresponding to a density of about 70% to 90% of true density, coaxially supporting said ring on a rotatable mandrel including applying clamping pressure to opposite sides of said ring while supported on said mandrel, roll-forming a raceway onto the outer circumferential bearing surface of said inner ring by feeding radially towards said ring and perpendicular to the axis thereof three substantially equally radially spaced circular roll-forming dies, each having a continuous projecting rib in the form of a male counterpart of the raceway being formed while said mandrel is rotating, one of said roll-forming dies having a circumference of about 5% to 15% less than the circumference of the remaining dies such as to provide die slippage during the formation of said raceway, and continuing the formation of said raceway to a suitable depth to support rolling elements therein whereby shear forces are simultaneously applied during formation of said raceway to remove pores therefrom, said raceway depth being formed in less than 10 revolutions of said ring, whereby a highly densified subsurface is obtained adjacent said raceway of average density of at least about 98% of true density while the remaining portion of said ring is maintained substantially porous over the range of about 85% to 92% of true density, the amount of clamping pressure being at least sufficient to inhibit the growth of said ring during the formation of said raceway while substantially inhibiting the cracking of said ring during the roll-forming of said raceway.

18. The method of claim 17, wherein the steel contains about 0.3% to 0.8% carbon.

19. The method of claim 17, wherein the raceway is formed in not more than 6 revolutions of said ring.

20. The method of claim 17, wherein the ratio of the diameter of the die to the diameter of the bearing ring ranges from about 2:1 to 4:1.

21. A bearing ring produced in accordance with the method of claim 5.

* * * * *